(12) United States Patent
Chebli et al.

(10) Patent No.: US 9,610,640 B2
(45) Date of Patent: Apr. 4, 2017

(54) METHOD FOR REMOVING A SECTION FROM A TIRE USING A SAW BLADE

(75) Inventors: Adib Tony Chebli, Greer, SC (US); Metodi Lubenov Ikonomov, Moore, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 1776 days.

(21) Appl. No.: 12/746,359

(22) PCT Filed: Dec. 6, 2007

(86) PCT No.: PCT/US2007/086622

§ 371 (c)(1),
(2), (4) Date: Aug. 24, 2010

(87) PCT Pub. No.: WO2009/073030

PCT Pub. Date: Jun. 11, 2009

(65) Prior Publication Data

US 2011/0023669 A1 Feb. 3, 2011

(51) Int. Cl.
*B23D 61/12* (2006.01)
*B23D 63/00* (2006.01)
(Continued)

(52) U.S. Cl.
CPC ......... *B23D 61/128* (2013.01); *B23D 61/121* (2013.01); *B23D 63/00* (2013.01); *B23D 63/201* (2013.01); *B23D 65/00* (2013.01); *Y10S 83/951* (2013.01); *Y10T 83/04* (2015.04); *Y10T 83/9319* (2015.04); *Y10T 83/9358* (2015.04)

(58) Field of Classification Search
CPC .... B23D 61/121; B23D 61/128; B23D 63/00; B23D 65/00; B23D 63/201; Y10T 83/9346; Y10T 83/9348; Y10T 83/935; Y10T 83/9353; Y10T 83/9355; Y10T 83/936;
(Continued)

(56) References Cited

U.S. PATENT DOCUMENTS 111,164 A * 1/1871 Andrews .............. B23D 61/121
83/849
238,521 A * 3/1881 Osgood ................ B23D 61/121
83/850
(Continued)

FOREIGN PATENT DOCUMENTS

GB 631550 * 11/1949 ........... B23D 63/201
WO WO 85/04619 A1 10/1985

OTHER PUBLICATIONS

PCT International Search Report for PCT/US2007/086622, dated Jul. 28, 2008.

*Primary Examiner* — Clark F Dexter
(74) *Attorney, Agent, or Firm* — Dority & Manning, P.A.

(57) ABSTRACT

A method and apparatus for removing a section from a tire is disclosed. The method and apparatus are configured so that one side of a saw blade used to cut a section from a tire is treated by dulling. The treatment allows for the removal of a section of a tire so cords embedded in various layers of the tire are protected from damage and the surface texture surrounding the removed section of the tire is adequate for repair.

9 Claims, 3 Drawing Sheets

(51) Int. Cl.
*B23D 65/00* (2006.01)
*B23D 63/20* (2006.01)

(58) Field of Classification Search
CPC ............. Y10T 83/9362; Y10T 83/9365; Y10T 83/9367
USPC ............................. 83/835, 846–855; 76/112
See application file for complete search history.

(56) References Cited

U.S. PATENT DOCUMENTS

| | | | |
|---|---|---|---|
| 239,710 A | | 4/1881 | Boynton |
| 495,345 A | | 4/1893 | Junge et al. |
| 1,033,996 A | | 7/1912 | Douglas |
| 1,494,576 A | * | 5/1924 | Biedermann et al. .......... 83/851 |
| 2,534,714 A | | 12/1950 | Anderson et al. |
| 2,768,423 A | * | 10/1956 | Stern .............................. 407/117 |
| 3,181,659 A | * | 5/1965 | Kohl ........................... 52/783.18 |
| 3,308,703 A | | 3/1967 | Sauer |
| 4,195,543 A | | 4/1980 | Tapply et al. |
| 4,802,396 A | * | 2/1989 | Kuklinski ....................... 83/849 |
| 4,967,477 A | | 11/1990 | Sanford |
| 5,094,135 A | | 3/1992 | Nakahara et al. |
| 5,361,665 A | * | 11/1994 | Sonefors ......................... 83/848 |
| 5,848,473 A | | 12/1998 | Brandenburg, Jr. |
| 6,244,152 B1 | | 6/2001 | DiNicolantonio |
| 6,532,852 B1 | | 3/2003 | Tsujimoto et al. |
| 2006/0016315 A1 | | 1/2006 | Zorich et al. |

\* cited by examiner

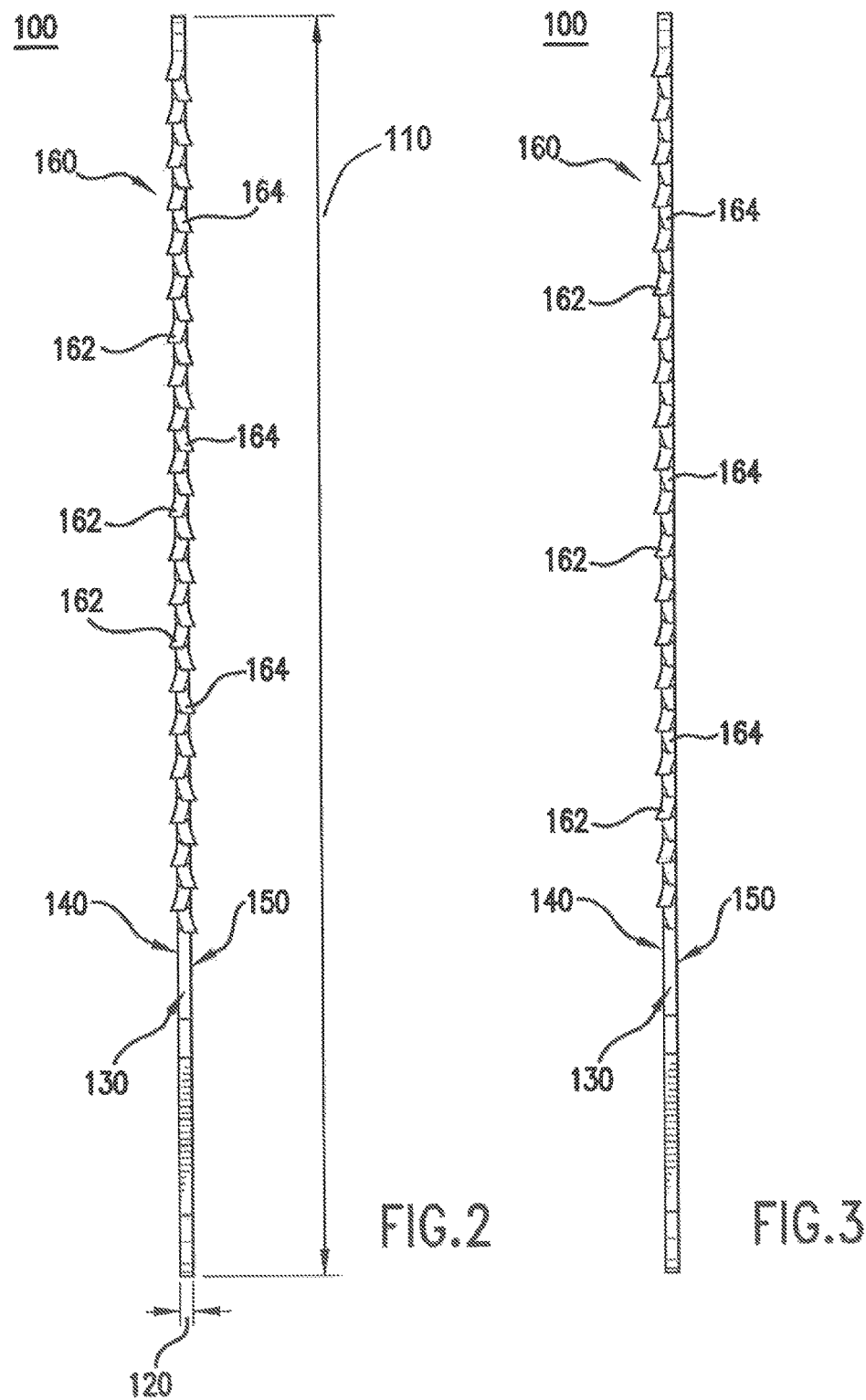

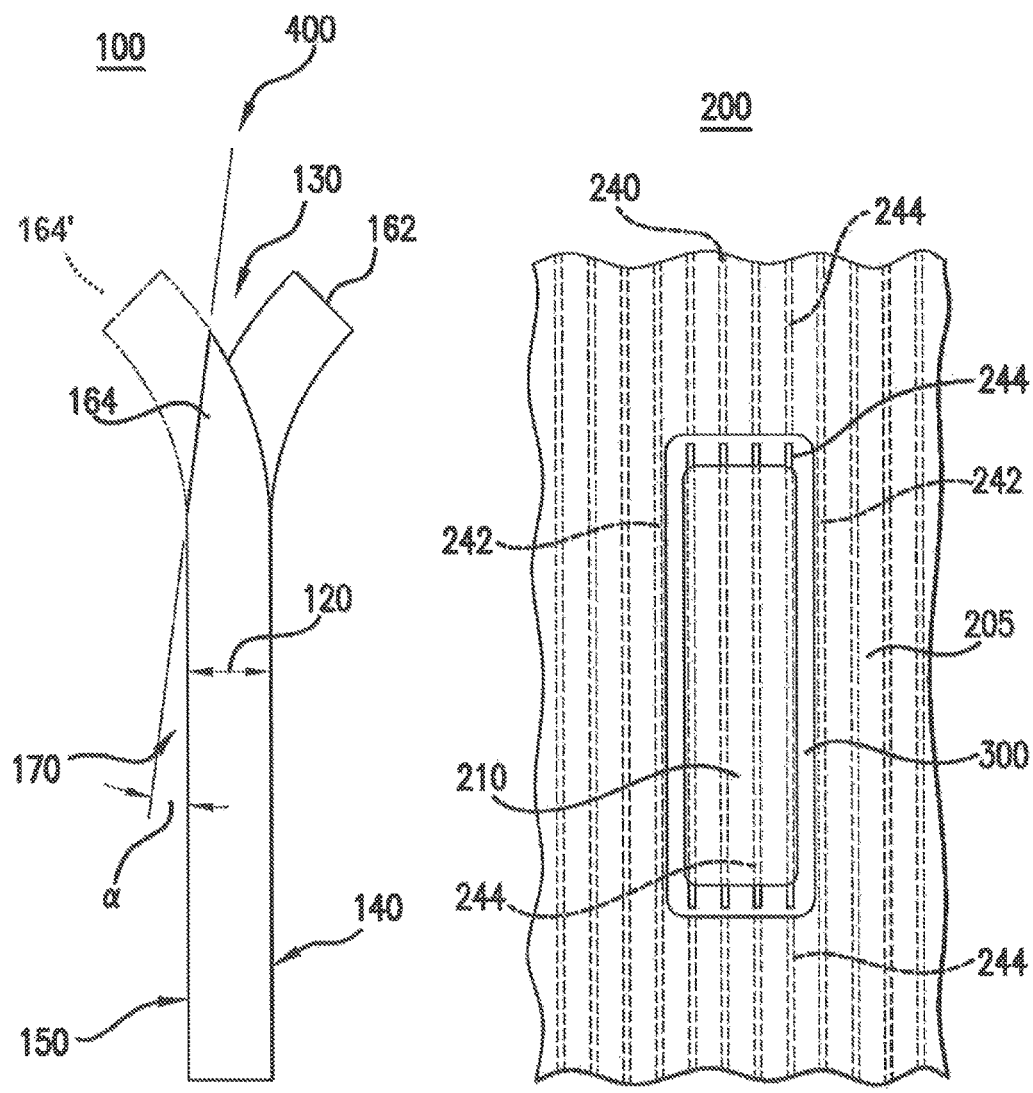

METHOD FOR REMOVING A SECTION FROM A TIRE USING A SAW BLADE

FIELD OF THE INVENTION

The present invention relates to the removal of sections from a tire for e.g., tire repair. More particularly, the present invention relates to a novel technique and apparatus for removing a section from a tire while protecting cords or other structural components from damage during the removal and providing an appropriate surface texture surrounding the removed section of the tire.

BACKGROUND OF THE INVENTION

The architecture of a pneumatic tire typically includes several layers. By way of example, a tire may include an air impermeable inner liner, a carcass layer, one or more belt cushion layers, and a tread layer. The carcass layer extends between beads located on respective sides of the tire in a manner adjacent to the air impermeable layer. As the tire is pressurized, the carcass layer helps retain the overall shape of the tire by containing the inner air impermeable layer and transferring force to the beads. As the tire is inflated, the beads operate to secure the tire onto the wheel. The carcass layer is typically strengthened by cords constructed from various materials including various steels and/or organic materials such as nylon, rayon, polyester, and the like. One or more belt cushion layers may be located radially outside the carcass layer. The belt cushion layers are typically composed of rubber and are also strengthened by embedded cords. A tread layer is located radially outside the one or more belt cushion layers. The tread layer is generally composed of rubber and contains a plurality of surface features, e.g. peaks and grooves, designed to help the tire grip the road. One or more of these structural features may also be present in a non-pneumatic tire as well, and the present invention is not limited to any particular tire type.

Sometimes it is necessary to remove a section from a tire to make repairs or to replace or install a device onto the tire. For example, the tire may have been damaged by a rupture or tear that extends partly or completely through the tire. In such case, one or more of the structures in the tire architecture as identified above may be damaged. Depending upon the extent and type of damage to the tire (or the nature of the device being added to the tire), it may be necessary to remove a section from the tire. As used herein, "section" means a portion of the tire that includes both the inside and outside surfaces of the tire.

Common tools for removing a section from a tire include air drills, grinders, stones, and wire cutters. The cutting of a tire with a saw blade poses several challenges. For example, while removing a section from the tire, it is generally desirable to avoid damage to cords or other components adjacent to the removed section that will remain with the tire after the section is removed. In addition, control of the saw blade to cut only a predetermined section from the tire can be difficult with a hand tool such as an electric or mechanized jigsaw because of the presence of various durable layers and components in the tire.

Another difficulty in removing a section of the tire with a saw blade is that the cords can only be cut with a jigsaw having a hard blade operated at high speed. In this case, the friction between the saw blade and the rubber causes the rubber to temporarily revert to liquid form, creating an undesirable surface texture surrounding the opening left by the removed section of the tire. A typical jig saw blade "cuts" the cords by pulling the cords until the tension causes them to break. As such, it is difficult to control the physical location where the cords embedded in the various layers of the tire will break. The cords may break on the side of the saw blade adjacent to the sidewall of the tire or the cords may break on the side of the saw blade adjacent to the section of the tire being removed. The cords that break on the side of the saw blade adjacent to the sidewall of the tire typically protrude unevenly from the surface surrounding the removed section of the tire.

Thus, a need exists for a method and system for removing a section of tire that facilitates removal of the section without undesirable damage to the tire and that also provides a better surface texture surrounding the removed section of the tire.

SUMMARY OF THE INVENTION

A summary of exemplary embodiments and methods of the present invention will be set forth here. Using the description provided herein, one skilled in the art will understand that additional exemplary embodiments and methods are within the scope of the present invention.

The present invention provides a saw blade having a length and a width for removing a section from a tire. The saw blade has first and second opposing surfaces and an edge oriented along the length of the saw blade that is adjacent to both first and second opposing surfaces. The saw blade includes a plurality of teeth protruding in opposing directions toward either the first opposing surface or the second opposing surface. Each tooth protruding toward the second opposing surface has been treated by dulling. For example, in one exemplary embodiment, each tooth protruding toward the second opposing surface has been treated by dulling each tooth at an angle non-orthogonal to the width of the saw blade. In variations of this exemplary embodiment, the plurality of teeth may be arranged sinusoidally along the edge of the saw blade. In a further variation of this exemplary embodiment, the plurality of teeth may be arranged so that each tooth protrudes in the opposite direction of each adjacent tooth. In yet a further variation of this exemplary embodiment, the saw blade may be bent in a plurality of alternate directions. In still a further variation of this exemplary embodiment, the plurality of teeth may be configured so that each tooth protruding toward the first opposing surface is longer than each tooth protruding toward the second opposing surface.

In another exemplary embodiment, the present invention provides a method for removing a section from a tire. The method includes dulling one side of a saw blade and cutting the section from the tire using the saw blade. The method further includes maintaining the smooth side of the saw blade away from the section of the tire being removed and adjacent to the remainder of the tire while cutting the section from the tire. In a variation of this exemplary embodiment, the saw blade has a length and a width and the saw blade may be smoothed at a non-orthogonal angle to the width of the saw blade. In another variation of this exemplary embodiment, the saw blade may be smoothed by grinding. In still a further variation of this exemplary embodiment, the saw blade has first and second opposing surfaces and an edge oriented along the length of the saw blade that is adjacent to both first and second opposing surfaces. The saw blade includes a plurality of teeth protruding in opposing directions toward either the first opposing surface or the second opposing surface. Each tooth protruding toward the second opposing surface has been treated by dulling.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 is a top view of a saw blade before being treated according to an exemplary method of the present invention.

FIG. 3 is a top view of a saw blade that has been treated according to an exemplary method of the present invention.

FIG. 4 is a close-up end view of a saw blade that has been treated according to an exemplary method of the present invention.

FIG. 5. depicts a plan view of a section of a tire being removed with a saw blade according to an exemplary method of the present invention.

DETAILED DESCRIPTION OF THE PREFERRED EMBODIMENTS

Figure 1:
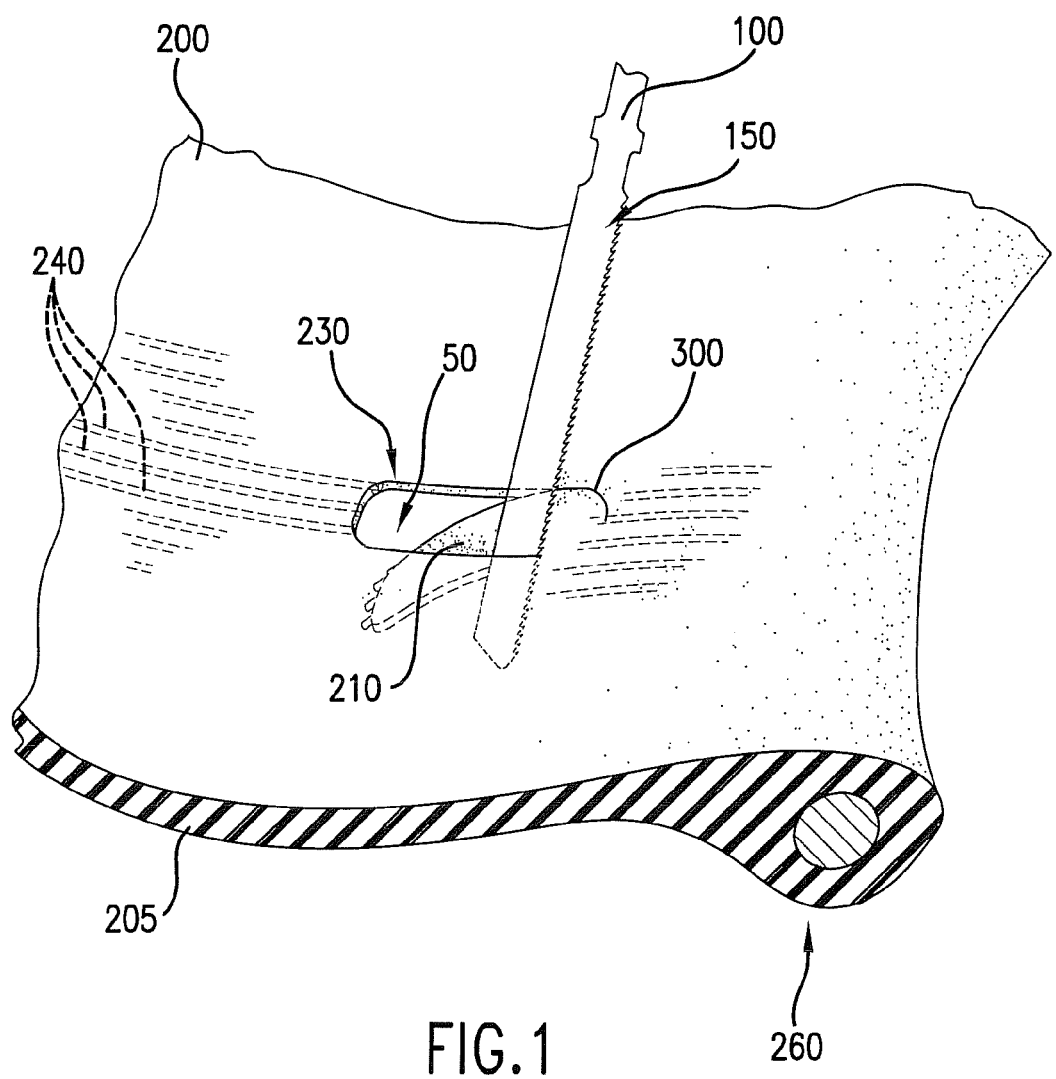
FIG. 1 depicts a section of a tire being removed with a saw blade.

Objects and advantages of the invention will be set forth in the following description, or may be apparent from the description, or may be learned through practice of the invention.

Referring now to FIG. 1, a typical tire 200 is illustrated for purposes of discussion only. The present invention is not limited to any particular tire type and, using the teachings disclosed herein, one of skill in the art will understand that the present invention may be used with a variety of pneumatic and non-pneumatic tire constructions. Accordingly, for purposes of describing the present invention, exemplary tire 200 includes a sidewall 205 and bead 260.

Embedded in various layers of the tire 200 are cords 240 that are part of e.g., the tire carcass. The cords may be composed of various materials including various steels.

FIG. 1 and FIG. 5 show a section 210 being removed from the tire 200 according to an exemplary embodiment of the present invention. A saw blade 100 that has been treated according to the present invention is used to cut a kerf 300 in the tire 200 to remove section 210 from the sidewall 205 of the tire 200. Once section 210 has been removed, a surface texture 230 surrounding the cut opening 50 remains. The saw blade 100 is treated according to an exemplary method of the present invention such that the cords 242 running adjacent to the section 210 and other structural components embedded inside the sidewall 205 are protected from damage and so that the surface texture 230 surrounding opening 50 provides an appropriate surface for repair.

FIG. 2 depicts a saw blade 100' prior to being treated according to the present invention. The saw blade 100' has a length 110 and a width 120. The saw blade has a first opposing surface 140 and a second opposing surface 150'. The first and second opposing surfaces 140 and 150' are both adjacent to an edge 130' oriented along the length 110 of the saw blade 100'. A plurality of teeth 160' are disposed along the edge 130' of the saw blade 100'. The plurality of teeth 160' include teeth 162 that protrude toward the first opposing surface 140 and teeth 164' that protrude toward the second opposing surface 150'.

The plurality of teeth 160' may be configured in a variety of ways. For example, FIG. 2 depicts a saw blade 100' with a plurality of teeth 160' configured so that each tooth protrudes in the opposite direction of each adjacent tooth. However, other configurations may be used without deviating from the scope and spirit of the present invention. For example, the plurality of teeth 160' may be configured sinusoidally along the edge 130' of the saw blade 100'. The saw blade 100' may be further configured so that the saw blade 100' is bent in a plurality of different directions. Various other configurations may be sufficient to produce a kerf 300 that is wider than the width 120 of the saw blade 100' to provide clearance for making turns with the saw blade 100' as well as for reducing the friction between the saw blade 100' and the tire 200.

A saw blade 100 that has been treated according to an exemplary method of the present invention is shown in FIG. 3. The teeth 164 that protrude toward the second opposing surface 150 have been treated by dulling. As used herein, the term dulling means any method of rubbing the saw blade 100 or the plurality of teeth 160 to remove the sharpness of the saw blade 100 along one side. The dulling treatment can be accomplished in a variety of ways. For example, the dulling treatment may be grinding, sanding, or other methods. After the second opposing surface 150 and teeth 164 have been treated by dulling, the second opposing surface 150 becomes what is referred to herein as the treated surface.

FIG. 4 provides a close-up end view of a saw blade 100 that has been treated according to the present invention. A plurality of teeth 160 are disposed along the edge 130 of the saw blade 100. An exemplary tooth 162 protrudes towards the first opposing surface 140. An exemplary tooth 164 protrudes towards a second opposing surface 150. The exemplary tooth 164 has been treated by dulling. The dashed lines in FIG. 4 show the shape of exemplary tooth 164' prior to being treated by dulling. The exemplary tooth 164 has been treated by dulling the tooth at a non-orthogonal angle 170 to the width 120 of the saw blade 100. The non-orthogonal angle 170 can be any non-orthogonal angle α between the treatment plane 400 and the second opposing surface 150 of the saw blade 100. As can be seen from FIG. 4, the tooth 162 that protrudes towards the first opposing surface 140 is longer than the treated tooth 164 that protrudes towards the second opposing surface 150.

The treated saw blade 100 has an asymmetrical structure with uneven cutting efficiency on one side versus the other. Specifically, the second opposing surface or treated surface 150 is less efficient at cutting cords 240 than the first opposing surface or untreated surface 140. Generally speaking, it is believed that the plurality of teeth 160 do not have the capability to physically cut the cords 240. Rather, the plurality of teeth 160 "cut" the cords 240 by pulling on the cords 240 until the tension in cords 240 causes them to break. After the teeth 164 protruding toward the treated surface 150 have been smoothed, the teeth 164 along second opposing surface 150 no longer have the capability to pull the cords 240 to cause them to break. Accordingly, the treated surface 150 is less efficient at cutting the cords 240 than the untreated surface 140.

Referring now to FIG. 1 and FIG. 5, the operation of the present invention will be described in more detail. Before removing the section 210 from the sidewall 205 of the tire 200, the saw blade 100' is treated according to an exemplary method of the present invention as described in the preceding paragraphs. After the saw blade 100' has been treated, the resulting saw blade 100 is used to cut a kerf 300 to remove section 210 from the remaining sidewall 205 of the tire 200. While cutting the kerf 300, the treated surface 150 is maintained adjacent to the sidewall 205 of the tire 200. The untreated surface 140 is maintained adjacent to the section 210 to be removed.

Maintaining the treated surface 150 adjacent to the sidewall 205 of the tire 200 ensures that the cords 242 running adjacent to the section 210 being removed are not damaged. As discussed above, the teeth 164 protruding toward the treated surface 150 have been treated by dulling. If the treated surface 150 is maintained adjacent to the sidewall 205 of the tire 200, the treated teeth 164 will not engage the cords 242 and other structural components embedded in the sidewall 205 during the removal of section 210. In this regard, the cords 242 are protected from damage. Moreover, maintaining the treated surface 150 adjacent to the sidewall 205 facilitates control of the saw blade 100. Because the treated teeth 164 do not engage the cords 242 or other structural components embedded in sidewall 205 during the removal process, less interference is generated between the tire 200 and the saw blade 100. Accordingly, the difficulty of controlling the saw blade with a hand tool such as a jig saw is diminished.

Maintaining the untreated surface 140 adjacent to the section 210 being removed ensures the surface texture 230 surrounding the cut opening 50 provides an appropriate surface for repair. First, the treated saw blade 100 may be operated at low speeds, reducing the friction between the rubber in the sidewall 205 and the saw blade 100. For instance, a Milwaukee Jig Saw Model #6266 may be operated on saw setting 1.5 at 300 strokes per minute. A Milwaukee Jig Saw operated on saw setting 1.5 at this speed yields a blade travel of 22 mm, a stroke travel of 44 mm, and an equivalent average speed of 220 mm/sec. The operation of the saw blade at low speeds ensures the surface texture 230 surrounding the cut opening 50 provides a rubber surface texture as desired according to the RMA scale.

Second, to remove section 210 from the sidewall 205 it is necessary to cut cords 244 running through section 210. As discussed above, the treated surface 150 is less efficient at cutting the cords 244 than the untreated surface 140. As such, the cords 244 will typically break on the side of the saw blade 100 adjacent to the untreated surface 140 as opposed to side of the saw blade 100 adjacent to the treated surface 150. If the saw blade 100 is maintained so that the untreated surface 140 is maintained adjacent to the section 210 being removed, the cords 244 will necessarily break adjacent to the section 210 being removed. As a result, the broken cords 244 will protrude from the section 210 being removed and not from the sidewall 205 of the tire 200. The broken cords 244 remain embedded in the sidewall 205.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for removing a section from a tire using a saw blade having first and second opposing surfaces adjacent to an edge along a length of said saw blade, said first and second opposing surfaces each lying within a respective plane, said edge comprising a plurality of teeth disposed along the length of the saw blade with a first subset of the plurality of teeth protruding towards the first opposing surface and a second subset of the plurality of teeth protruding towards the second opposing surface such that said first subset of the plurality of teeth protrude beyond the plane of the first opposing surface and said second subset of the plurality of teeth protrude beyond the plane of the second opposing surface, said second opposing surface being flat along the entire length of said saw blade, the method comprising:

dulling the second subset of the plurality of teeth that protrude towards said second opposing surface of said saw blade so that none of the teeth of the saw blade extend past the plane of the second opposing surface;

cutting said section from said tire using said saw blade on which said dulling was performed; and during said cutting, maintaining said second opposing surface of said saw blade away from the section of the tire being removed and adjacent to the remainder of the tire.

2. The method of claim 1, wherein the step of dulling further comprises dulling the second subset of the plurality of teeth at a non-orthogonal angle to said second opposing surface of said saw blade.

3. The method of claim 1, wherein the step of dulling comprises dulling by grinding the second subset of the plurality of teeth that protrude towards the second opposing surface.

4. The method of claim 1, wherein the saw blade is operated at a low speed during said cutting said section from said tire using said saw blade.

5. The method of claim 1, wherein each said tooth protruding toward said second opposing surface has been treated by said step of dulling so that each said tooth protruding toward said first opposing surface is longer than each said tooth protruding toward said second opposing surface.

6. The method of claim 1, wherein the blade has a width orthogonal to the length of the blade, wherein each said tooth protruding toward said second opposing surface has been treated by said step of dulling so as to dull said tooth at a non-orthogonal angle to the width of the blade.

7. The method of claim 1, wherein the plurality of teeth are arranged so that each said tooth protrudes in an opposite direction of each adjacent tooth.

8. The method of claim 1, wherein the step of dulling comprises removing a sharpness of each said tooth of said second subset of the plurality of teeth.

9. The method of claim 1, wherein said method further comprises the step of:

maintaining the first opposing surface of said saw blade adjacent the section of the tire being removed during said cutting said section from said tire using said saw blade.

* * * * *